US005518657A

United States Patent [19]

Fringeli et al.

[11] Patent Number: 5,518,657

[45] **Date of Patent: * May 21, 1996**

[54] STORAGE-STABLE FORMULATION OF FLUORESCENT WHITENING MIXTURES

[75] Inventors: Werner Fringeli, Laufen; Josef Zelger, Riehen, both of Switzerland

[73] Assignee: Ciba-Geigy Corporation, Tarrytown, N.Y.

[ * ] Notice: The portion of the term of this patent subsequent to Dec. 15, 2013, has been disclaimed.

[21] Appl. No.: 278,708

[22] Filed: Jul. 22, 1994

Related U.S. Application Data

[63] Continuation of Ser. No. 969,894, Nov. 2, 1992, abandoned.

[30] Foreign Application Priority Data

Nov. 7, 1991 [CH] Switzerland ............................ 3245/91

[51] Int. Cl.$^6$ .................................................... C09K 11/06

[52] U.S. Cl. ............................... 252/301.23; 252/301.21; 252/301.34; 252/558; 252/174.17; 252/174.18

[58] Field of Search ......................... 252/301.21, 301.23, 252/301.34, 301.35, 543, 179, 174.25, 558, 549, 174.17, 174.18

[56] References Cited

U.S. PATENT DOCUMENTS

| | | | |
|---|---|---|---|
| 3,655,574 | 4/1972 | Frischkorn et al. | 252/301.23 |
| 4,263,176 | 4/1981 | Martini et al. | 252/301.34 |
| 4,323,396 | 4/1982 | Ehl et al. . | |
| 4,326,982 | 4/1982 | Neumann et al. . | |
| 4,363,744 | 12/1982 | Gunther et al. | 252/301.23 |
| 4,787,912 | 11/1988 | Abel et al. | 8/582 |
| 5,030,244 | 7/1991 | Neumann et al. | 252/301.21 |
| 5,035,825 | 7/1991 | Eckhardt et al. | 252/301.21 |
| 5,051,111 | 9/1991 | Anceschi et al. | 8/648 |
| 5,053,055 | 10/1991 | Fringeli et al. | 252/301.21 |
| 5,076,968 | 12/1991 | Fringeli et al. | 252/301.34 |
| 5,152,922 | 10/1992 | Meyer et al. | 252/301.21 |

FOREIGN PATENT DOCUMENTS

| | | |
|---|---|---|
| 2010909 | 8/1990 | Canada . |
| 008669 | 3/1980 | European Pat. Off. . |
| 033913 | 8/1981 | European Pat. Off. . |
| 235080 | 9/1987 | European Pat. Off. . |
| 323399 | 7/1989 | European Pat. Off. . |
| 345765 | 12/1989 | European Pat. Off. . |
| 2367803 | 10/1977 | France . |
| 1337583 | 11/1973 | United Kingdom . |

OTHER PUBLICATIONS

Chemical Abstracts, vol. 105, No. 9, (1986), 154612z (Month Unknown).

The New Encyclopedia Britannica, vol. 2, 15th Edition, p. 114, (1986). (Month Unknown).

Abstract for DE 2,246,843, Apr. 1973.

*Primary Examiner*—Prince Willis, Jr.
*Assistant Examiner*—Alan D. Diamond
*Attorney, Agent, or Firm*—Kevin T. Mansfield

[57] ABSTRACT

Storage-stable formulations of whitening mixtures comprising at least two anionic fluorescent whiteners, which preferably contain at least one sulfonic acid radical; an anionic polysaccharide; dispersants and water, and if appropriate auxiliaries. These formulations are particularly suitable for the preparation of liquid washing agents.

23 Claims, No Drawings

STORAGE-STABLE FORMULATION OF FLUORESCENT WHITENING MIXTURES

This application is a continuation, of application Ser. No. 07/969,894, filed Nov. 2, 1992, abandoned.

The present invention relates to storage-stable fluorescent whitener formulations, a process for their preparation and their use.

Fluorescent whiteners are usually preferably marketed in the form of aqueous solutions or suspensions. For this, for example, the moist filter cakes or the dry powders are suspended with water. Dispersants and thickeners are then added to the suspensions thus obtained, in order to increase the homogeneity, wettability and stability. As a further auxiliary, an electrolyte is often also added. However, the auxiliaries used to date have not been able to prevent sedimentation of the whiteners and/or a high increase in viscosity, especially at high storage temperatures, over a prolonged period of time.

It has now been found, surprisingly, that storage-stable formulations of concentrated aqueous whitener mixtures are obtained if small amounts of an anionic polysaccharide, in combination with the electrolyte and dispersant, are admixed to the aqueous suspension of such whitener mixtures. Such suspensions hardly settle at all during storage. In addition to having good sedimentation properties, the suspensions remain homogeneous during storage.

The fluorescent whitener formulations according to the invention accordingly have a content of:

a) 15 to 45% by weight, based on the total weight of the whitener formulation, of a mixture of at least two anionic fluorescent whiteners;

b) 0.1 to 25% by weight, based on the total weight of the whitener formulation, of an electrolyte or an electrolyte mixture;

c) 0.01 to 1% by weight, based on the total weight of the whitener formulation, of an anionic polysaccharide;

d) 0.2 to 20% by weight, based on the total weight of the whitener formulation, of one or more dispersants;

e) if appropriate other additives; and f) water as the remainder to make up 100% by weight.

These novel formulations are suspensions, and are stable for at least 6 months at a temperature of −5° C. to 40° C.

Such formulations preferably comprise anionic fluorescent whiteners which contain at least one sulfonic acid radical.

Examples of fluorescent whiteners are:

a) whiteners of the triazine series of the formula:

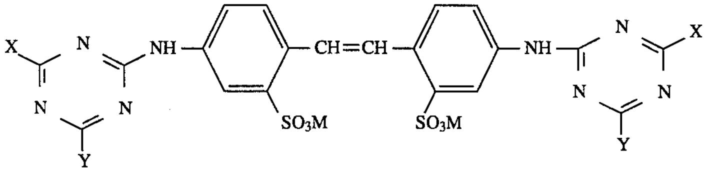

(1)

in which X and Y, which can be identical or different, are a secondary or tertiary amine or unsubstituted or mono- or di-substituted alkoxy and M is a hydrogen atom or a salt-forming cation. Secondary and tertiary amine are, for example, phenylamine which is unsubstituted or mono- or polysubstituted by $C_1$–$C_4$alkyl, $C_1$–$C_4$alkoxy, sulfo, halogen, cyano or carboxyl, and morpholine, piperidine, methylamine, ethylamine, propylamine, butylamine, β-hydroxyethylamine, β-hydroxypropylamine, β-cyanoethylamine, dimethylamine, diethylamine, dipropylamine, bis-β-hydroxyethylamine, N-methyl-N-ethylamine, N-methyl-N-β-hydroxyethylamine, N-ethyl-N-β-hydroxyethylamine, N-methyl-N-β-hydroxypropylamine, N-ethyl-N-β-hydroxypropylamine, benzylamine, N-β-hydroxyethyl-benzylamine, cyclohexylamine, N-ethylcyclohexylamine, 2-methoxyethylamine, 2-ethoxyethylamine, N-methyl-2-methoxy ethylamine and 3-methoxypropylamine. Examples of unsubstituted or mono- or disubstituted alkoxy are methoxy, ethoxy, n-propoxy, i-propoxy, butoxy, β-hydroxy-ethoxy, β-methoxy-ethoxy and β-ethoxy-ethoxy.

Fluorescent whiteners of the formula (1) which are of particular interest are those in which X and Y, which can be identical or different, are a phenylamino group, which is unsubstituted or mono- or disubstituted by alkyl radicals having 1 or 2 carbon atoms; the morpholino group; an alkylamino group having 1 to 4 carbon atoms, which can be substituted by hydroxyl radicals; or an alkoxy group having 1 to 4 carbon atoms; and M is hydrogen or a salt-forming cation.

Fluorescent whiteners of the formula (1) which are furthermore preferred are those in which X and Y, which can be identical or different, are the phenylamino or the morpholino group or an alkylamino group having 1 to 4 carbon atoms, which can be substituted by hydroxyl radicals, and M is hydrogen or a salt-forming cation. The morpholino and the N-methyl-N-ethanolamino group are particularly preferred here.

Examples are the fluorescent whiteners of the formulae (2)

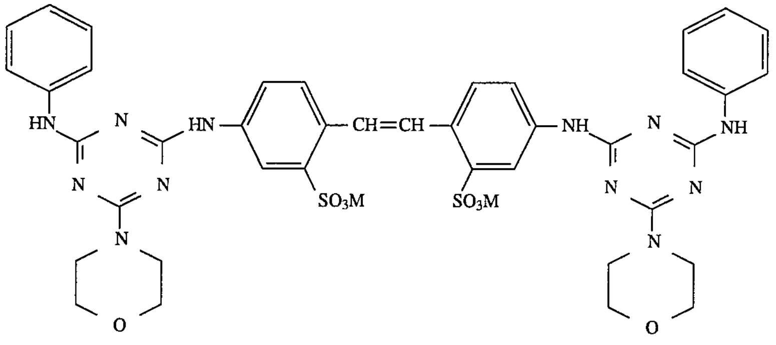

(2)

in which M is an alkali metal ion, a content of 2 to 25% by weight, based on the total weight of the suspension, of a strong electrolyte advantageously being present in the case of this fluorescent whitener; and (3)

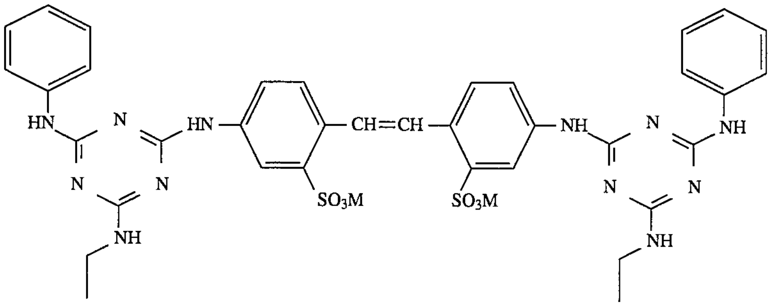

(3)

in which M is an alkali metal ion.

b) Whiteners of the distilbene series, thus, for example, compounds of the formula:

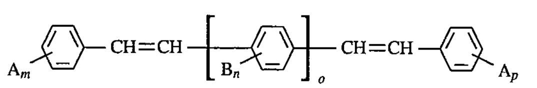

(4)

in which A is a sulfonic acid radical, hydrogen, $C_1$–$C_4$alkyl, $C_1$–$C_4$alkoxy or halogen and B is hydrogen, $C_1$–$C_4$alkyl, $C_1$–$C_4$alkoxy or halogen, with the condition that at least one substituent A is a sulfonic acid radical, and m, n, o and p independently of one another are the number 1 or 2.

Those compounds in which o is 2 are preferred.

Particularly preferred compounds are the compounds of the formulae

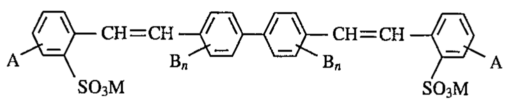

(5)

and

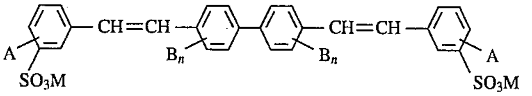

(6)

in which A, B and n are as defined above and M is a salt-forming cation.

Halogens are, in particular, fluorine, chlorine and bromine, but in particular chlorine.

$C_1$–$C_4$Alkyl radicals are unbranched and branched alkyl radicals, such as the methyl, ethyl, n- and iso-propyl and n-, sec- and tert-butyl radical. These $C_1$–$C_4$alkyl radicals can in turn be substituted by, for example, aryl (phenyl, naphthyl), $C_1$–$C_4$alkoxy, OH, halogen, sulfo or CN groups.

Salt-forming cations M are, for example, alkali metal, ammonium or amine salt ions. Amine salt ions which are preferred are those of the formula $H^+NR_1R_2R_3$, in which $R_1$, $R_2$ and $R_3$ independently of one another are hydrogen, alkyl, alkenyl, hydroxyalkyl, cyanoalkyl, halogenoalkyl or phenylalkyl, or in which $R_1$ and $R_2$ together complete a 5- to 7-membered saturated nitrogen-containing heterocyclic ring, which can additionally contain a nitrogen or oxygen atom as a ring member, for example a piperidine, piperazine, pyrrolidine, imidazoline or morpholine ring, while $R_3$ is hydrogen. Preferred salt-forming cations are alkali metal salts, $Na^+$ and $K^+$ being particularly preferred.

Preferred distyrylbiphenyl compounds of the formula (4) are those in which the cation M is an alkali metal, ammonium or amine ion, potassium and sodium having particular importance from practical considerations.

Compounds which are of practical interest here are

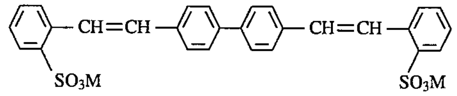

(7)

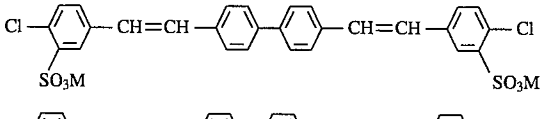

(8)

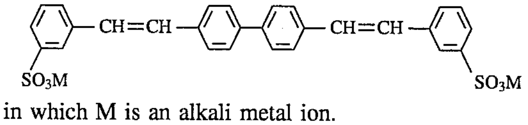

(9)

in which M is an alkali metal ion.

Preferred mixtures comprise in each case 5 to 30% by weight, based on the total weight, but together not more than 45% by weight, or two, three or four whiteners of the formulae (2), (3), (7) and (8), the ratio of the fluorescent whiteners with respect to one another being between 1:9 and 9:1, preferably between 1:4 and 4:1, in 2-component mixtures, which are particularly preferred.

One or more alkali metal salts and salts of lower carboxylic acids, for example, can be used as the electrolyte.

Examples of electrolytes are sodium chloride, sodium sulfate, sodium phosphate, sodium carbonate, sodium formate or one of the corresponding potassium salts, and mixtures of these electrolytes. Sodium chloride and the formates are preferred here. The amount of electrolyte can be 0.1 to 25% by weight, preferably 0.5 to 20% by weight and particularly preferably 0.5–15% by weight, based on the total weight of the formulation.

The anionic polysaccharides which can be used according to the invention belong to the group of modified polysaccharides which can be derived from cellulose, starch or the heteropolysaccharides, it being possible for the side chains to contain further monosaccharides, for example mannose and glucuronic acid. Examples of anionic polysaccharides are sodium alginate, carboxymethylated guar, carboxymethylcellulose, carboxymethyl-starch, carboxymethylated locust bean flour and, particularly preferably, xanthan.

The amount of polysaccharide is 0.01 to 1% by weight, a range from 0.05 to 0.5% by weight being preferred and a range of 0.05–0.2% by weight being particularly preferred, in each case based on the total weight of the formulation. However, these ranges can be exceeded in formulations of very high concentration or very low concentration.

If appropriate, the whitener formulation according to the invention can comprise additives; examples are preservatives, such as chloroacetamide or aqueous formaldehyde solution, Mg/Al silicates, odour improvers and antifreeze agents.

Examples of Mg/Al silicates are bentonite, montmorillonite, zeolites and highly disperse silicic acids. They are usually added in an amount of 0.2–1% by weight, based on the total weight of the whitener formulation.

Dispersants which can be used are those of the anionic or nonionic type. Examples of these are alkylbenzenesulfonates, alkyl or alkenyl ether-sulfonate salts, saturated or unsaturated fatty acids, alkyl or alkylene ether-carboxylic salts, sulfo-fatty acid salts or esters, phosphate esters, polyoxyethylene alkyl or alkenyl ethers, polyoxyethylene alkylvinyl ethers, polyoxypropylene alkyl or alkenyl ethers, polyoxybutylene alkyl or alkenyl ethers, higher fatty acid alkanolamides or alkylene oxide adducts, sucrose/fatty acid esters, fatty acid/glycol monoesters, alkylamine oxides and condensation products of aromatic sulfonic acids with formaldehyde, and lignin-sulfonates, or mixtures of the above-mentioned dispersants. The condensation products of aromatic sulfonic acids with formaldehyde, and lignin-sulfonates are preferred. Condensation products of naphthalenesulfonic acids with formaldehyde and of ditolyl ether-sulfonic acids with formaldehyde are particularly preferred.

The content of dispersant is 0.2 to 20% by weight, based on the total weight of the formulation, preferably 0.1 to 10% by weight, particularly preferably 0.2 to 5% by weight. Formulations according to the invention are obtained by mixing the moist press-cakes or the dry powders of at least two anionic fluorescent whiteners, which contain at least one sulfonic acid radical, in an amount of 15 to 45% by weight, preferably 15 to 40% by weight and particularly preferably 19–40% by weight, based on the total weight of the formulation; with 0.01 to 1% by weight of anionic polysaccharide; 0.1 to 25% by weight of electrolyte; 0.2 to 20% by weight of dispersant; if appropriate with other additives; and with water, and homogenising the mixture at room temperature.

The desired content of anionic fluorescent whitener in the suspension can be adjusted by addition either of water or aqueous electrolyte or of further dry powder to the moist filter cake. This adjustment can be made before, during or after addition of the anionic polysaccharide.

The novel fluorescent whitener formulations are used in particular for incorporation into washing agents, for example by allowing the required amount of the fluorescent whitener formulation according to the invention to run from a tank into a mixing device which contains a suspension of the washing agent or the dispersant.

The present invention accordingly also relates to a process for the preparation of solid and liquid washing agents, and to the washing agents obtained by this process, which comprises mixing, for example, a suspension of detergents customary for washing agents with a suspension, according to the invention, of whiteners, and drying the mixture. The drying procedure here can be carried out by, for example, a spray-drying method.

The whitener formulation according to the invention furthermore can be used for the preparation of liquid washing agents.

The following examples illustrate the invention, without limiting it thereto. Percentage data relate to the total weight of the formulation.

EXAMPLE 1

The components shown in Table 1 are mixed and homogenised, while stirring at 20° C.

The whitener formulations obtained remain liquid, and form no deposits after standing at –5° C., room temperature and 40° C. for two months.

TABLE 1

| % of | Experiment No. | | | | | | | | | | | | | | |
|---|---|---|---|---|---|---|---|---|---|---|---|---|---|---|---|
| component | 2 | 3 | 4 | 5 | 6 | 7 | 8 | 9 | 10 | 11 | 12 | 13 | 14 | 15 | 16 |
| (7) | 14.0 | 10.0 | 6.0 | 13.3 | 10.0 | 6.7 | 13.3 | 10.0 | 6.7 | 13.3 | 10.0 | 6.7 | - | 15.0 | 7.5 |
| (2) | 5.7 | 9.5 | 13.3 | 6.3 | 9.5 | 12.7 | - | - | - | - | - | - | - | 8.3 | 7.5 |
| (3) | - | - | - | - | - | - | 6.7 | 10.0 | 13.3 | - | - | - | 10.0 | - | 7.5 |
| (9) | - | - | - | - | - | - | - | - | - | 6.7 | 10.0 | 13.3 | 10.0 | 6.7 | 7.5 |
| NaCl | 6.8 | 6.3 | 5.8 | 6.7 | 6.3 | 5.8 | 5.0 | 3.8 | 2.5 | 5.0 | 3.8 | 2.5 | 5.0 | 8.0 | 8.0 |
| $NaSO_4$ | 0.4 | 0.6 | 0.9 | 0.4 | 0.6 | 0.9 | 2.3 | 3.5 | 4.6 | 0.5 | 0.7 | 1.0 | 0.5 | 0.5 | 0.5 |
| Sodium tripolyphosphate | - | - | - | - | - | - | - | - | - | 2.5 | 3.7 | 4.9 | 3.7 | 2.5 | 2.8 |
| Naphthalenesulfonic acid/formaldehyde condensation product | 0.3 | 0.3 | 0.3 | 0.7 | 0.5 | 0.3 | 0.3 | 0.3 | 0.3 | 0.3 | 0.3 | 0.3 | 0.3 | 0.3 | 0.3 |
| Chloroacetamide | 0.3 | 0.3 | 0.3 | 0.3 | 0.3 | 0.3 | 0.3 | 0.3 | 0.3 | 0.3 | 0.3 | 0.3 | 0.3 | 0.3 | 0.3 |
| Xanthan | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 |
| Water | 72.4 | 72.9 | 73.3 | 72.2 | 72.7 | 73.2 | 72.0 | 72.0 | 72.2 | 71.3 | 71.1 | 70.9 | 70.1 | 58.3 | 58.0 |

EXAMPLE 2

The components shown in Table 2 are mixed with 1% by weight, based on the total weight of the whitener formulation, of the condensation product of ditolyl ether-sulfonic acids with formaldehyde; 0.15% by weight of xanthan and water and the mixture is homogenised, while stirring.

The whitener formulations remain liquid and form no deposits after standing at room temperature and 40° C. for several weeks.

EXAMPLE 3

20% by weight of a fluorescent whitener of the formula (2); 10% by weight of a fluorescent whitener of the formula (7); 1% by weight of NaCl; 0.5% by weight of bentonite; 1% by weight of the condensation product of ditolyl ether-sulfonic acids with formaldehyde; 0.1% by weight of xanthan and 67.4% by weight of water are mixed and the mixture is homogenised, while stirring.

The whitener formulations remain liquid and form no deposits after standing at room temperature and 40° C. for several weeks.

TABLE 2

| | Experiment No. | | | | | | | | | | | | | | |
|---|---|---|---|---|---|---|---|---|---|---|---|---|---|---|---|
| % of component | 17 | 18 | 19 | 20 | 21 | 22 | 23 | 24 | 25 | 26 | 27 | 28 | 29 | 30 | 31 |
| (7) | 15.0 | 15.0 | 15.0 | 15.0 | 15.0 | 20.0 | 20.0 | 20.0 | 20.0 | 20.0 | 10.0 | 10.0 | 10.0 | 10.0 | 10.0 |
| (2) | 15.0 | 15.0 | 15.0 | 15.0 | 15.0 | 10.0 | 10.0 | 10.0 | 10.0 | 10.0 | 20.0 | 20.0 | 20.0 | 20.0 | 20.0 |
| NaCl | 6.0 | 8.0 | 10.0 | 12.0 | 14.0 | 6.0 | 8.0 | 10.0 | 12.0 | 14.0 | 6.0 | 8.0 | 10.0 | 12.0 | 14.0 |

What is claimed is:

1. A storage-stable liquid whitener formulation which comprises a) 15 to 45% by weight, based on the total weight of the whitener formulation, of a mixture of at least two anionic fluorescent whiteners, wherein one of the fluorescent whiteners is of the formula (1)

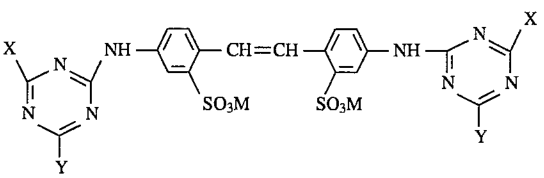

(1)

in which

X and Y are, independently of each other, a secondary or tertiary amine radical or a mono- or disubstituted alkoxy group and M is a hydrogen atom or a salt-forming cation, and the other fluorescent whitener is of the formula (4)

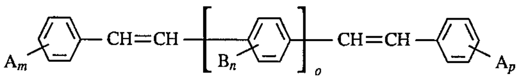

(4)

in which

A is a sulfonic acid radical, hydrogen, $C_1$–$C_4$alkyl, $C_1$–$C_4$alkoxy or halogen and B is hydrogen, $C_1$–$C_4$alkyl, $C_1$–$C_4$alkoxy or halogen, with the proviso that at least one substituent A is a sulfonic acid radical, and m, n, o and p, independently of each other are the number 1 or 2;

b) 0.1 to 25% by weight, based on the total weight of the whitener formulation, of an electrolyte or an electrolyte mixture;

c) 0.01 to 1% by weight, based on the total weight of the whitener formulation, of an anionic polysaccharide;

d) 0.2 to 20% by weight, based on the total weight of the whitener formulation, of one or more condensation products of aromatic sulfonic acids with formaldehyde as dispersants; and water.

2. A storage-stable liquid whitener formulation according to claim 1, wherein the content of whitener mixture is 15 to 40% by weight.

3. A storage-stable liquid whitener formulation according to claim 1, which comprises two anionic fluorescent whiteners.

4. A storage-stable liquid whitener formulation according to claim 3, wherein the weight ratio of the two anionic fluorescent whiteners is between 1:9 and 9:1.

5. A storage-stable liquid whitener formulation according to claim 4, wherein the ratio of the two anionic fluorescent whiteners is between 1:4 and 4:1.

6. A storage-stable liquid whitener formulation according to claim 1, wherein the content of electrolyte is 0.5 to 20% by weight.

7. A storage-stable liquid whitener formulation according to claim 1, wherein the content of polysaccharide is 0.05 to 0.5% by weight.

8. A storage-stable liquid whitener formulation according to claim 1, wherein the content of said dispersant is 0.1 to 10% by weight.

9. A storage-stable liquid whitener formulation according to claim 1, which comprises a) 19 to 40% by weight, based on the total weight of the whitener formulation, of a mixture of at least two anionic fluorescent whiteners;

b) 0.5 to 15% by weight, based on the total weight of the whitener formulation, of an electrolyte or an electrolyte mixture;

c) 0.05 to 0.2% by weight, based on the total weight of the whitener formulation, of an anionic polysaccharide;

d) 0.2 to 5% by weight, based on the total weight of the whitener formulation, of said dispersants and water.

10. A storage-stable liquid whitener formulation according to claim 1, which additionally comprises, Mg/Al silicates in an amount of 0.2–1% by weight, based on the total weight of the whitener formulation.

11. A storage-stable liquid whitener formulation according to claim 10, wherein bentonite is the Mg/Al silicate.

12. A storage-stable liquid whitener formulation according to claim 9, wherein the anionic polysaccharide is a modified polysaccharide which is derived from cellulose, starch or heteropolysaccharides.

13. A storage-stable liquid whitener formulation according to claim 12, wherein the modified polysaccharide is derived from cellulose.

14. A storage-stable liquid whitener formulation according to claim 13, wherein the anionic polysaccharide is xanthan.

15. A storage-stable liquid whitener formulation according to claim 1, wherein the dispersant is a condensation product of one or more naphthalenesulfonic acids with formaldehyde, or of ditolyl ether-sulfonic acids with formaldehyde.

16. A storage-stable liquid whitener formulation according to claim 1, wherein one of the fluorescent whiteners has the formula (2) or (3)

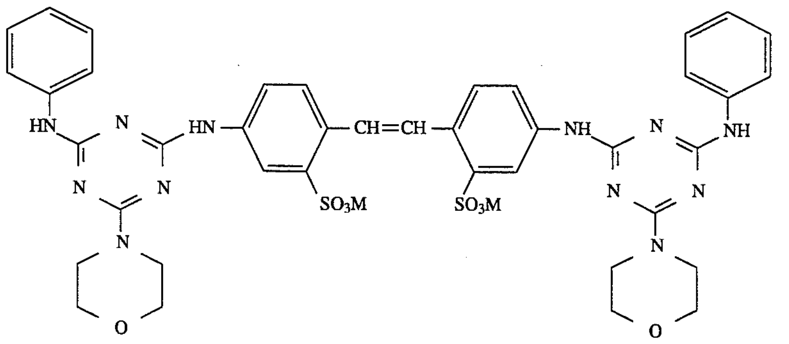
(2)

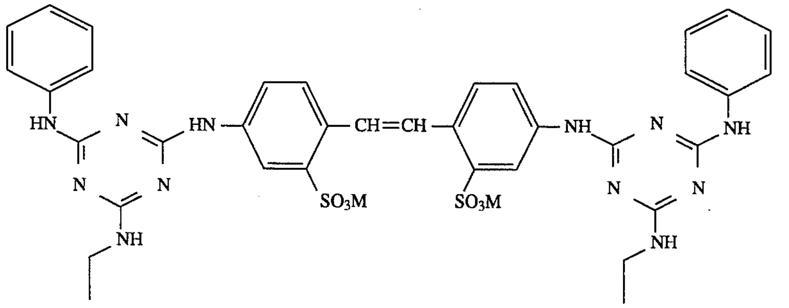
(3)

in which M is an alkali metal ion.

17. A storage-stable liquid whitener formulation according to claim 1, wherein one of the fluorescent whiteners has the formula (7), (8) or (9)

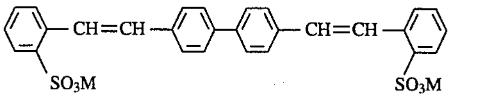
(7)

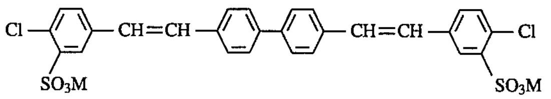
(8)

-continued

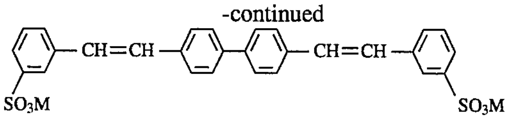
(9)

in which M is an alkali metal ion.

18. A storage-stable liquid whitener formulation according to claim 1, which comprises in each case 5 to 30% by weight, based on the total weight of the whitener formulation, of an anionic fluorescent whitener of the formula (7) and (2)

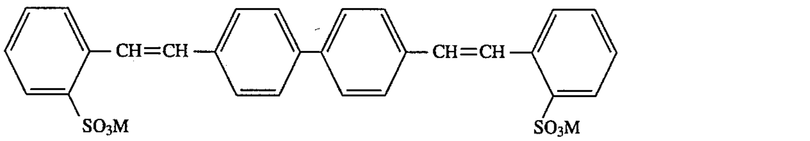
(7)

-continued

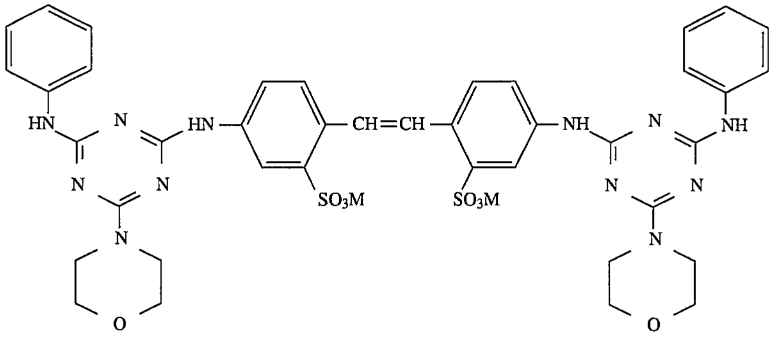
(2)

in which M is an alkali metal ion.

19. A storage-stable liquid whitener formulation according to claim 1, which comprises in each case 5 to 30% by weight, based on the total weight of the whitener formulation, of an anionic fluorescent whitener of the formula (7) and (3)

-continued

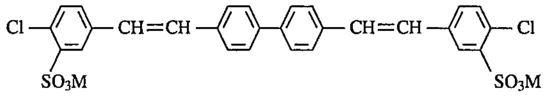
(8)

in which M is an alkali metal ion.

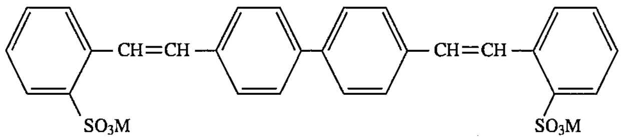
(7)

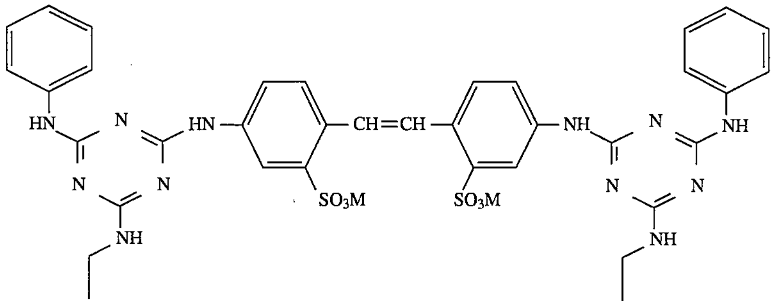
(3)

in which M is an alkali metal ion.

20. A storage-stable liquid whitener formulation according to claim 1, which comprises in each case 5 to 30% by weight, based on the total weight of the whitener formulation, of an anionic fluorescent whitener of the formula (7) and (8)

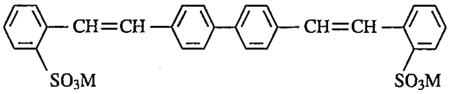
(7)

21. A storage-stable liquid whitener formulation according to claim 1, which comprises a) in each case 5 to 20% by weight, based on the total weight, of two, three or four whiteners of the formulae (7), (8), (2) and (3)

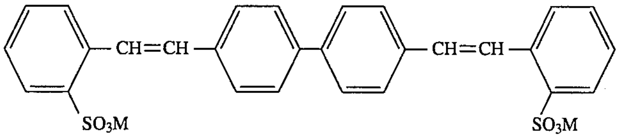
(7)

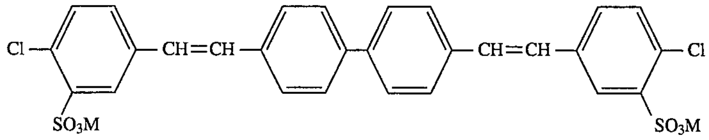
(8)

-continued

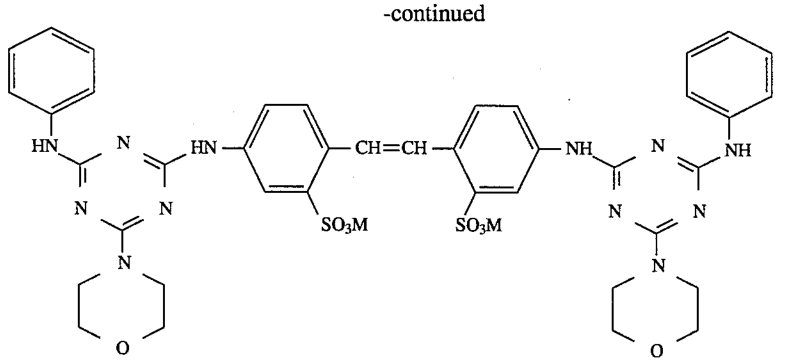

(2)

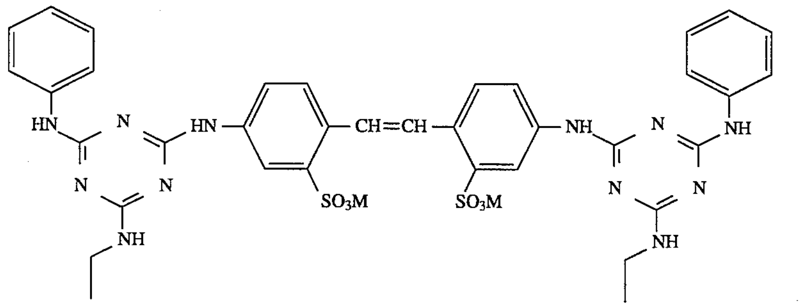

(3)

in which M is $Na^+$ or $K^+$;

b) 0.5 to 15% by weight, based on the total weight of the whitener formulation, of NaCl;

c) 0.05 to 0.2% by weight, based on the total weight of the whitener formulation, of xanthan;

d) 0.2 to 5% by weight, based on the total weight of the whitener formulation, of said dispersant and water.

22. A storage-stable liquid whitener formulation according to claim 21, which additionally comprises, 0.2–1% by weight, based on the total weight of the whitener formulation, of bentonite.

23. A method of preparing a washing agent, which comprises mixing the liquid whitener formulation according to claim 1 with a suspension of detergents.

* * * * *